United States Patent Office 3,524,529
Patented Aug. 18, 1970

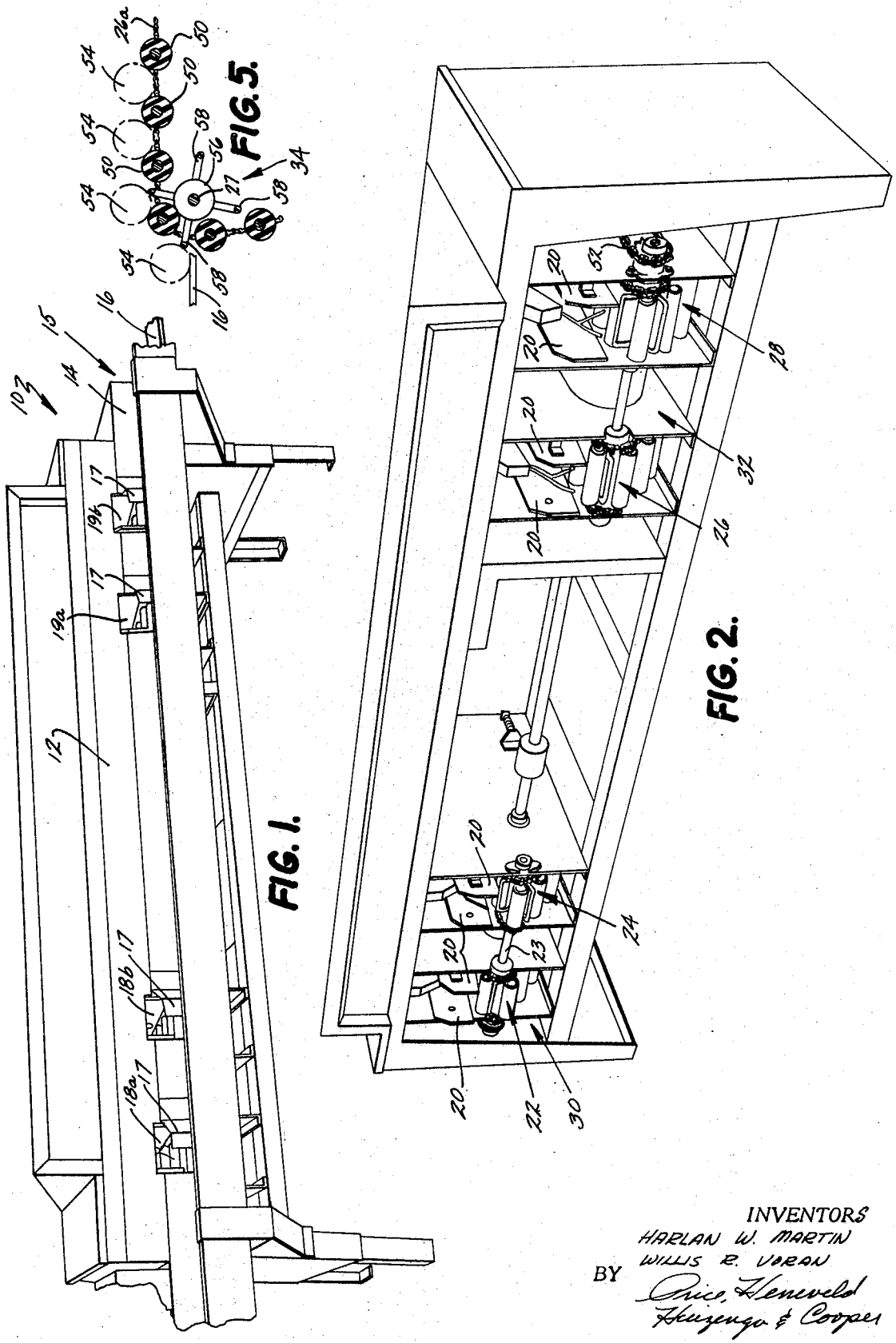

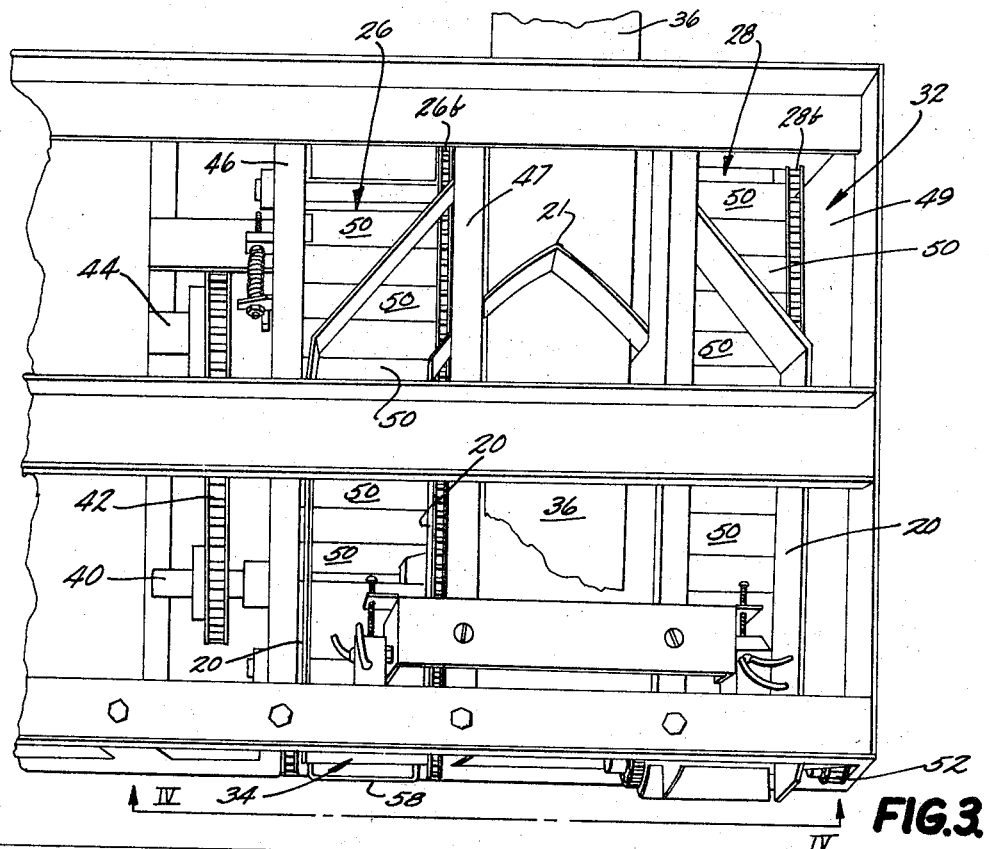
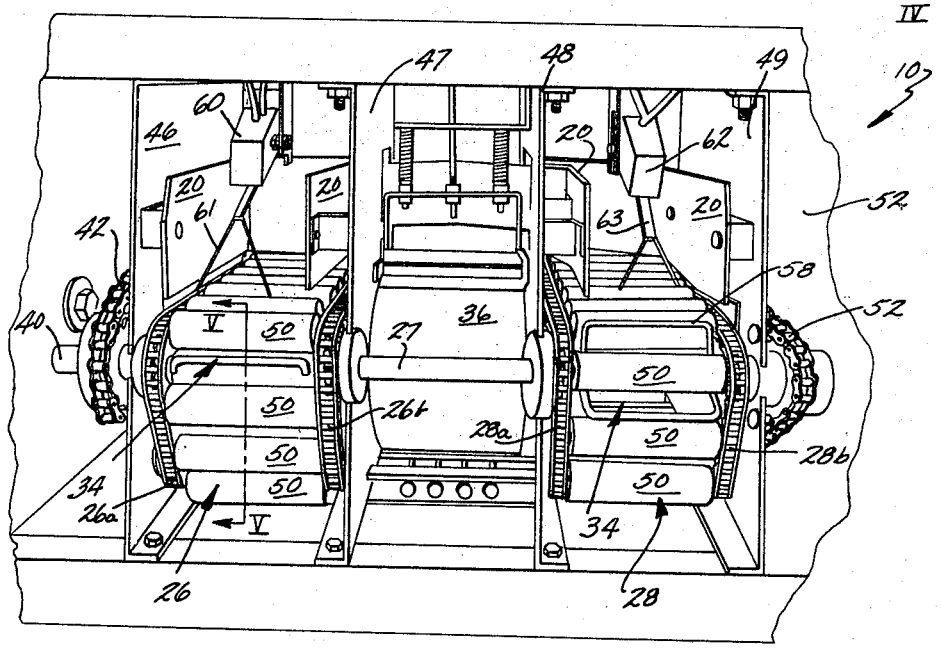

3,524,529
TRANSVEYOR SYSTEM FOR EGG COLLECTION
Willis R. Voran, Zeeland, Mich., and Harlan W. Martin, New Holland, Pa., assignors, by mesne assignments, to U.S. Industries, Inc., New York, N.Y., a corporation of Delaware
Filed Feb. 1, 1968, Ser. No. 702,289
Int. Cl. B65g 47/22
U.S. Cl. 198—22                                    14 Claims

ABSTRACT OF THE DISCLOSURE

A mechanism for transferring eggs from a first to a second egg-conveying device or mechanism, including an intermediate conveyor opreating between said first and second conveyor means and comprised of a pair of movable conveyor members, each formed by a plurality of spaced, interconnected cylindrical elements arranged to cradle and carry an egg between each two adjacent such elements. Egg guiding members are utilized to divide the flow of eggs on the aforesaid first conveyor means so that a portion of the flow is directed onto each of the conveyor members of the intermediate conveyor, thereby reducing the number of eggs each such member is required to carry and allowing the spaced elements of each such member to segregate the eggs thereupon and carry them singly and individually. The positioning of the spaced elements in the two such intermediate conveyor members is staggered with respect to each other, such that the presence of eggs on both such members occurs in an alternating sequence, in which sequence the eggs are placed on the aforesaid second conveyor means, in conjunction with an egg-ejecting apparatus forming a part of the transveyor mechanism and located at the terminus of the intermediate conveyor.

BACKGROUND

In relatively recent times, poultry kept for egg-production purposes are increasingly being maintained in confinement cages. The eggs produced by poultry housed and kept in such cages are collected in an automated manner in which the eggs roll or otherwise move out of the confinement cages and onto a first conveyor means located adjacent the cages. From this first conveyor means the eggs are subsequently transferred to a second conveyor means forming a primary collection instrument. Typically, this primary conveyor runs to and from a central place of collection, where the eggs are cleaned, graded, and packed.

The handling of eggs by such an automated collection system present several problems of a somewhat unusual and unique nature, owing to the fragile nature of the eggs. For example, there are numerous problems associated with the transfer of the eggs from the cages onto the first conveyor mechanism and there are also numerous problems associated with merely conveying the large numbers of eggs involved along the relatively lengthly expanses of conveyors usually encountered. One of the most troublesome areas, however, arises in connection with the transfer of the eggs from the first to the second or primary conveyor means, particularly since this oridinarily involves a right-angled change of direction for the eggs being moved.

It is for performing this transferring function that devices commonly known as "transveyors" have been devised and incorporated. Normally, both the primary and secondary conveyors used have belt-type movable members, normally made of interwoven jute or like fibers, and it is a known procedure in the art of belt-type conveyors to provide intersections between belts moving in different directions, normally by passing one belt directly beneath the other so that articles carried on the first are merely pushed onto the second, whereup the articles immediately change direction. The simplest transveyor mechanisms use this basic principle, together with a variety of facilitating mechanisms for assisting in pushing or otherwise transferring the eggs directly from one belt onto the other. Later and somewhat more sophisticated transveyors utilize intermediate conveyors or other transfer means which act between the two belt-type conveyors, and transveyors of this general type are now usually recognized as providing significantly improved operation and performance. Still, numerous problems remained to be solved in order to provide truly smooth and gentle transfer of the eggs, and also to prevent undue egg collisions upon the primary collection conveyor. It is problems of this nature to which the persent invention is addressed and for which the present invention provides an effective solution.

SUMMARY

The basic apparatus of the present transveyor mechanism comprises an intermediate conveyor whose movable conveyor member is made up of a plurality of mutually spaced, generally cylindrical elements, the size and mutual spacing of which is designed to carry individual eggs between adjacent such elements, between oppositely disposed surface portions of each pair of the plurality of cylindrical elements; thereby effectively segregating eggs from each other and carrying them singly. This intermediate conveyor has a terminus located directly adjacent the primary egg-collection conveying means, and eggs carried upon the intermediate conveyor are transferred to the primary conveying means by an egg-ejecting mechanism which operates to move an egg from between a pair of intermediate conveyor member elements outwardly thereof and onto the primary egg-collection conveyor means. Further, the present transveyor mechanism itself includes a pair of intermediate conveyor members instead of only a single such member, each located generally parallel to the other and operating in the same direction, and each having its cylindrical conveying elements in staggered relation to the elements of the other such member. This staggered relationship alternates the timing of the eggs transferred by the transveyor mechanism onto the primary conveyor means, thereby reducing the possibility of collisions.

DRAWINGS

In the drawings:
FIG. 1 is a fragmentary, frontal perspective view of a preferred form of the present transveyor mechanism;
FIG. 2 is a perspective view of the mechanism of FIG. 1 with portions removed to show internal structural features;
FIG. 3 is a fragmentary enlarged, overhead plan view of the present transveyor mechanism;
FIG. 4 is a fragmentary side elevation of the mechanism of FIG. 3, as taken through the vertical plane IV—IV thereof; and
FIG. 5 is a fragmentary sectional elevation of the egg-ejection means, as taken through the vertical plane V—V of FIG. 4.

PREFERRED EMBODIMENT

The transveyor mechanism 10 of the invention is shown in FIG. 1 in a typical operating environment, wherein the front wall portion 12 of the transveyor abuts or lies directly adjacent the primary egg-collection conveyor means 15, which includes the trough-like conveyor bed shown at 14 upon which rides a belt-type conveyor member 16. As illustrated, the trough-like bed 14 may be mounted upon or supported in an elevated position by the transveyor mechanism 10, and that wall of the trough 14 which is positioned closest to the front of the transveyor preferably lies in direct contact therewith. Two pairs of mutually spaced openings 18a, 18b and 19a, 19b extend through both the front wall 12 of the conveyor mechanism and the aforesaid side of the bed 14 directly adjacent wall 12, and through these openings pass the eggs being moved onto the primary collection conveyor 15. Angularly-extending guards or shields 17 are preferably provided which extend into the interior of the conveyor bed 14, outwardly and somewhat in front of each of the aforesaid openings, to shield eggs passing therethrough from collisions with eggs moving along upon the belt 16.

With the front wall portion 12 of the transveyor mechanism removed, the interior structure shown in FIG. 2 becomes evident. Within the transveyor mechanism, each of the openings 18a, 18b, and 19a, 19b leads into a passage defined by a pair of spaced vertical walls 20. These are positioned directly above the side extremities of individual movable conveyor members 22, 24, 26, 28, each pair of which define an intermediate conveyor 30, 32. As illustrated, a common shaft 23 is used to drive both conveyor members 22 and 24 of intermediate conveyor 30, while a like shaft 27 performs a like function for conveyor members 26 and 28 of intermediate conveyor 32.

In FIGS. 3 and 4 the transveyor mechanism is shown with the top portions of its shrouding or housing removed to expose the components making up intermediate conveyor 32. This conveyor, as well as intermediate conveyor 30 which is identical thereto, comprises basically the pair of conveyor members 26 and 28 mentioned previously, together with an egg-ejecting means 34 located at the front of the transveyor mechanism and operating in conjunction with each of the conveyor members 26 and 28.

The transveyor mechanism 10 provides an entrance or opening at its rearward side, between conveyor members 26 and 28, through which a conveyor belt 36 passes. This belt forms the moving member of a conveyor means which brings eggs to the transveyor from the poultry cages or other such source. Belt 26 extends between and is on the same general level with the conveyor members 26 and 28 of the intermediate conveyor, and passes forwardly therebetween and around a roller member 38 located near the front of the transveyor, in order to change the direction of motion of this belt and allow it to return to its opposite end extremity. Roller member 38 may be, and preferably is, a driven member which imparts movement to belt 36 as the latter passes around this roller; for this reason roller 38 preferably is mounted upon a shaft 40 extending laterally within the transveyor and carrying a suitable sprocket or other such drive gear enabling a drive chain 42 to rotate shaft 40. As illustrated, chain 42 passes around a suitable drive gear mounted on a shaft 44 (FIG. 3), by which it is coupled to an electric motor or the like.

The spaced walls 20 noted previously as defining the openings 18a, 18b and 19a, 19b at the front of the transveyor mechanism exit from belt 36 and connect with the conveyors 26 and 28 at an angle. They are elongated in nature and comprise extensions of elongated walls located within the transveyor mechanism which serve as directors or egg-guidance means for channeling eggs carried into the transveyor on belt 36 off from this belt at a first angle onto each of the two conveyor members 26 and 28 at a second angle equal to the first angle. As illustrated, the closest or central two such walls 20 are actually one continuous member in the preferred embodiment shown, having straight parallel portions extending rearwardly into the device, where they angularly converge to form a broad prow-like corner or point 21 (FIG. 3) which is located generally at the center of belt 36 and extends vertically upward thereof. The outer two walls 20 are symmetrically disposed and angle toward each other within the device in a convergent manner, remaining generally parallel with the walls forming the aforementioned corner 21. It is the angle formed by the walls 20 with the three parallel conveyors that insures that the eggs are directed to the conveyor members 26 and 28 in a singulated, or generally single-file manner.

All the walls or partition members 20 are preferably mounted by attachment to vertical wall sections 46, 47, 48, and 49 within the transveyor mechanism (FIG. 4), with walls 47 and 48 having openings therein through which the egg-guidance walls forming corner 21 pass. It is through these openings that eggs from belt 36 pass onto the intermediate conveyor members 26 and 28. The manner in which this happens will be apparent upon examination of FIG. 3, when it is considered that the movement of belt 36 is forward, toward the front of the transveyor mechanism and toward the angular corner or point 21, directly beneath which the belt 36 passes. That is, eggs moved along on belt 36 will encounter the corner 21 and be diverted angularly along the walls 20 forming this corner, directly onto one or the other of the intermediate conveyor members, in approximately equal division, assuming equal initial distribution of eggs on belt 36.

The two intermediate conveyor members 26 and 28 are comprised of mutually spaced, parallel, generally cylindrical elements 50, which are interconnected at their end extremities by chains 26a, 26b and 28a, 28b which serve to support these elements in spaced relationship and to drive them in an endlessly circling manner. These chains pass over appropriate sprockets mounted on the shaft 27 mentioned previously, located at the front of the transveyor mechanism. Shaft 27 sextends laterally toward the right, through vertical wall 49 of the transveyor, where a drive sprocket mounted on this shaft engages a drive chain 52, by which shaft 27 is driven in a rotary manner to move the aforementioned conveyor chains and the cylindrical elements 50 carried thereby. As will be understood, sprockets or other such rotary members are located toward the rear of the transveyor, by which conveyor members 26 and 28 complete their circuitous path.

The individual conveyor elements 50 each preferably has a central shaft by which it is coupled to the conveyor chains 26a, 26b and 28a, 28b noted previously, and the exterior portion of each such conveyor element is preferably made of rubber or other at least moderately resilient material so as to provide gentle handling to the eggs deposited thereupon. The spacing between these elements is such that the smallest size of eggs to be handled by the device will fit between a pair of adjacent elements in the manner shown in FIG. 5, wherein the eggs are designated 54. That is, each such egg will rest upon and be cradled between each such pair of conveyor elements 50. Due to the generally circular cross section of these elements, it will be apparent that eggs guided onto the conveyors 26, 28 in a random manner will roll between the nearest pair of elements 50. Thus, the nature and spacing of these conveyor elements acts to segregate the eggs one from another and carry them singly along foward the front of the transveyor mechanism.

As the eggs 54 reach the forward extremity of travel of the intermediate conveyor members 26, 28, at which position these conveyor members change their direction of motion by passing around the aforementioned sprockets mounted on shaft 27 (which point is referred to herein as one terminus of the intermediate conveyors) the eggs 54 leave the intermediate conveyor members and are transferred directly onto the belt 16 of the primary collection conveyor, which passes along the front of the transveyor mechanism (FIGS. 1 and 5). The transfer of eggs 54 from the intermediate conveyor members to belt 16 is facilitated by the egg-ejection means 34, mentioned previously. Basically, this comprises a generally cylindrical roller-like member 56 mounted on shaft 27 (FIG. 5), together with a plurality of wide U-shaped ejection members 58 which are attached in mutually spaced relation around the periphery of the roller 56.

Ejection members 58 are arranged on roller 56 such that, due to the positive and pre-established drive or rotational relationship between drive shaft 27 and roller 56 on the one hand and between drive shaft 27 and the chains 26a, 26b of the intermediate conveyors on the other hand, each of the ejection members 58 will be rotated sequentially around roller 56 and will pass upwardly between an adjacent pair of conveyor elements 50 as the same approach the ejection means. As such pair of conveyor elements continues to advance toward vertical alignment with the roller 56, such ejection member continues to move upwardly between the conveyor elements. At the point where the intermediate conveyor members move around their aforesaid terminus and change the dirction of their motion, the ejection members act to boost the eggs out from between the adjacent conveyor elements and onto belt 16 of the primary collection conveyor. This greatly facilitates the transfer of eggs from the intermediate conveyors onto belt 16, since the process is one of gradual egg displacement, rather than one of actually rolling or dropping the eggs directly from one such conveyor to the other. As illustrated, the ejection members are preferably elongated between their end extremities, where they attach to the roller member 56, such that the width of the ejection members is directly comparable to that of the individual conveyor elements 50. Thus, the ejection of each egg carried by each adjacent pair of conveyor elements is made certain, regardless of the particular position which that egg may happen to occupy across the width of the mutually cooperating adjacent roller elements.

As best seen in FIGS. 2 and 4, the eggs which have been diverted from the first collection conveyor belt 36 and which are being transferred to the primary or central collection conveyor belt 16 may be individually counted as they pass along the intermediate conveyor members 26, 28. This is advantageously accomplished by electrical switches such as are seen at 60, 62 (FIG. 4), which have downwardly depending feeler arms 61, 63 respectively, by which the switches are actuated as a result of the passage of an egg beneath and past the end extremities of the feeler arms, causing the arms to be moved upwardly momentarily. Due to the elongated nature of the conveyor elements 50, the feeler arms 61, 63 of the aforesaid counting switches 60, 62 should have a divergent or laterally-extended configuration such as the one illustrated, in order to be certain that any egg moved by either of the intermediate conveyor members toward its forward terminus will actuate one or the other of the counting switches.

An important feature of the side-by-side or laterally-spaced parallel dual conveyor members of each of the intermediate conveyors is the relative arrangement of the conveyor elements 50 of each. As may be seen from FIGS. 2, 3, and 4, the conveyor elements 50 of the pair of intermediate conveyor members 26, 28 are not in lateral alignment, but are instead in a staggered arrangement. This arrangement, together with the egg-spacing and segregating characteristic of the conveyor members themselves, provides an operation where the eggs are ejected from the intermediate conveyor onto the primary collection conveyor belt 16 in an alternating fashion, i.e., first from one of the outlets openings 19a, 19b, and then from the other such opening. This operation significantly reduces the probabilities of direct collisions between eggs being placed on the primary collection belt 16 from a given intermediate conveyor.

As will be understood, the two ejection means at the forward terminus of each intermediate conveyor member 26, 28 are thus to be arranged on the support shaft 27 in an angularly displaced fashion, so as to cooperate in the required manner with the respective conveyor member associated with each particular ejection means. Due to the aforementioned staggered and alternating sequence of egg passage along the intermediate conveyor members, the counting switches 60, 62 may be coupled into a single counter unit or head, since the counter-actuating pulses from each such switch will also alternate, and there will be no opportunity for a pulse from the two such switches to arrive at their common counting head at the same time to thereby produce an erroneous count. This in itself is an important feature, since the counting heads are an expensive component and it is highly desirable to eliminate one of them wherever this can be achieved.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

We claim:

1. A transveyor mechanism for transferring eggs from a first conveyor means to a second, comprising in combination: an intermediate conveyor having a pair of longitudinally movable conveyor members, each with a terminus located generally adjacent said second conveyor means; each of said intermediate conveyor members including means for mutually separating and spacing eggs transferred thereto and carried thereon, egg-guidance means associated in flow communication with such first conveyor means to guide eggs off such conveyor and onto each of said intermediate conveyors, said egg-guidance means operating to thereby reduce the quantity of and singulate the eggs guided onto each of said intermediate members so that the egg-spacing means of the latter can segregate the eggs and the latter can carry such eggs singly; and said intermediate conveyor including means at the said terminus of its conveyor members for transferring the eggs carried by it onto said second conveyor means singly and in a segregated manner, whereby mutual contact and resulting breakage of eggs transferred between said first and second conveyor means is substantially reduced.

2. The transveyor mechanism of claim 1, wherein said intermediate conveyor member egg-spacing means includes a plurality of spaced conveying elements.

3. The transveyor mechanism of claim 2, wherein said conveying elements comprise generally cylindrical members, each spaced from another sufficiently to carry eggs therebetween.

4. The transveyor mechanism of claim 3, wherein said intermediate conveyor includes egg-ejection means at the terminus of each of said conveyor members for pushing eggs out from between said cylindrical members and onto said second conveyor means.

5. The transveyor mechanism of claim 4, wherein said ejection means comprises a member arranged to effectively move upwardly and outwardly between pairs of said cylindrical members carrying an egg therebetween.

6. The transveyor mechanism of claim 5, wherein said intermediate conveyor includes a roller means at each said terminus, each said conveyor member passing around said roller means to change its direction of motion, and said ejection means member extending outwardly of said roller means to pass between pairs of said cylindrical members as they pass around the roller means.

7. The transveyor mechanism of claim 6, wherein said roller means comprises a rotatable shaft element, and wherein said ejection member comprises an element fixedly carried on said shaft element.

8. The transveyor mechanism of claim 7, wherein said ejection means includes a plurality of said fixed elements, each spaced from the others about the periphery of said shaft element.

9. The transveyor mechanism of claim 2, wherein each of said spaced conveying elements in one of said conveyor members occupies a staggered position with respect to said spaced conveying elements of said other of said conveyor members.

10. The transveyor mechanism of claim 1, wherein said intermediate conveyor is arranged such that each of its said conveyor members alternates with the other in transferring eggs carried thereby onto said second conveyor means.

11. The transveyor mechanism of claim 10, wherein said two conveyor members are generally coextensive and the terminus of each is located in the same general plane and directly adjacent said second conveyor means, said egg-spacing means of each of said conveyor members arranged such that the eggs carried by the two such members arrive at such terminus plane in an alternating manner and are transferred to said second conveyor means in the same way.

12. The transveyor mechanism of claim 1, wherein said egg-guidance means includes separating means for diverting the flow of the eggs from said first conveyor so that each one of said pair of conveyor members shares the flow with the other of said pair.

13. The transveyor mechanism of claim 12, wherein said egg-guidance means includes a pair of diverging channels each exiting from said first conveyor means at an angle and connecting with a different one of said pair of intermediate conveyor members at a second angle; and said separating means comprises a prow-shaped flow divider at said first conveyor formed by the convergence of said pair of channels.

14. The transveyor mechanism of claim 13, wherein said conveyor members are each generally parallel to said first conveyor means, and wherein said first and second angles are generally equal.

References Cited

UNITED STATES PATENTS

| | | | |
|---|---|---|---|
| 626,284 | 6/1899 | Lyons | 198—183 |
| 1,921,577 | 8/1933 | Nelson | 198—75 |
| 2,264,156 | 11/1941 | Apple | 198—79 |
| 3,019,581 | 2/1962 | Phillips | 198—29 |
| 3,166,175 | 1/1965 | Kurtz | 198—30 |
| 3,419,128 | 12/1968 | Leonard | 198—81 |

RICHARD AEGERTER, Primary Examiner

U.S. Cl. X.R.

198—129, 183